United States Patent Office 3,605,234
Patented Sept. 20, 1971

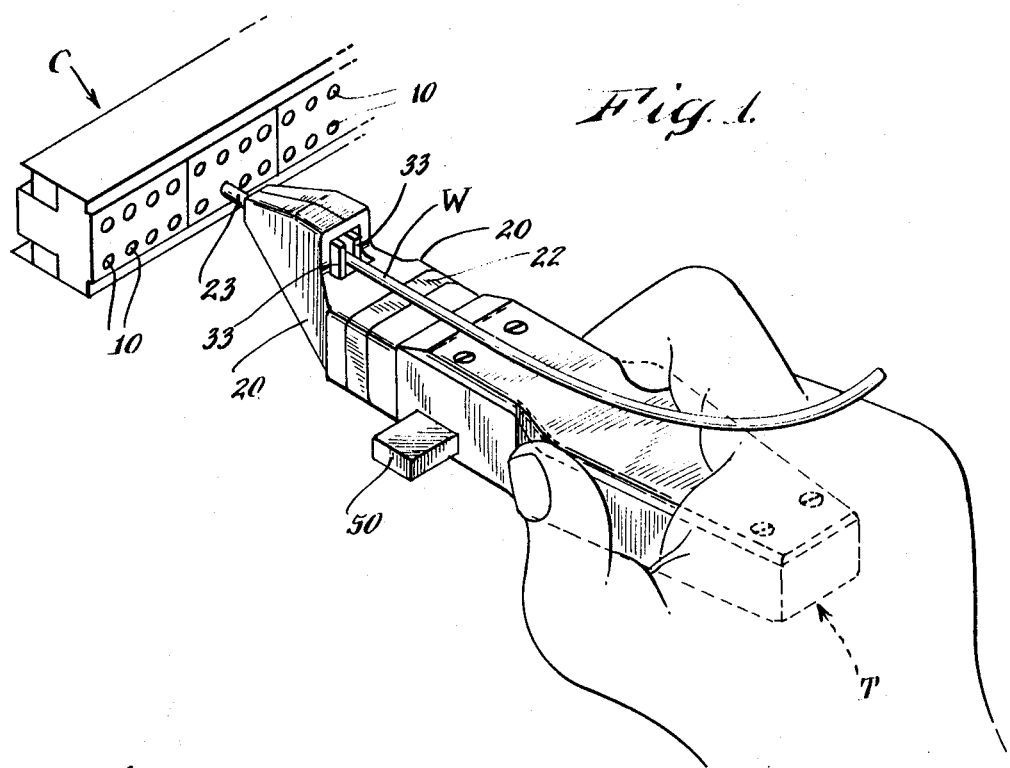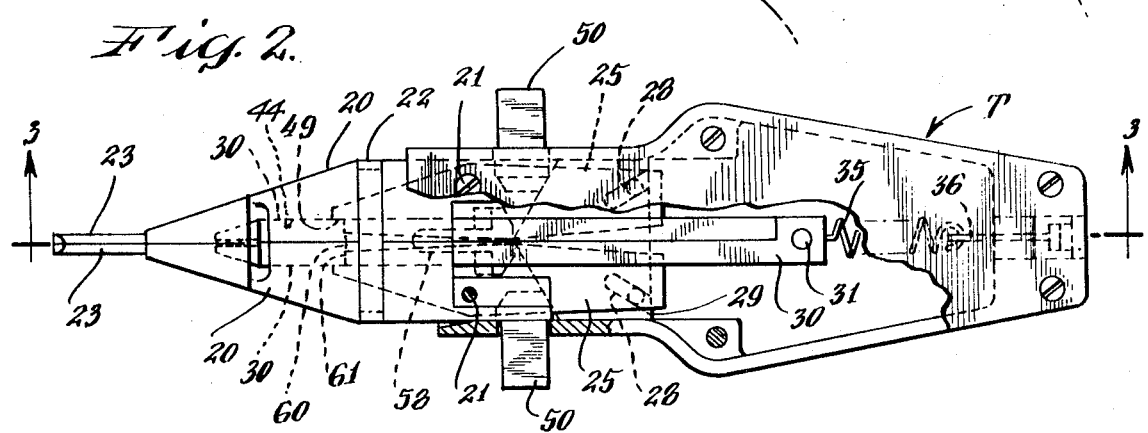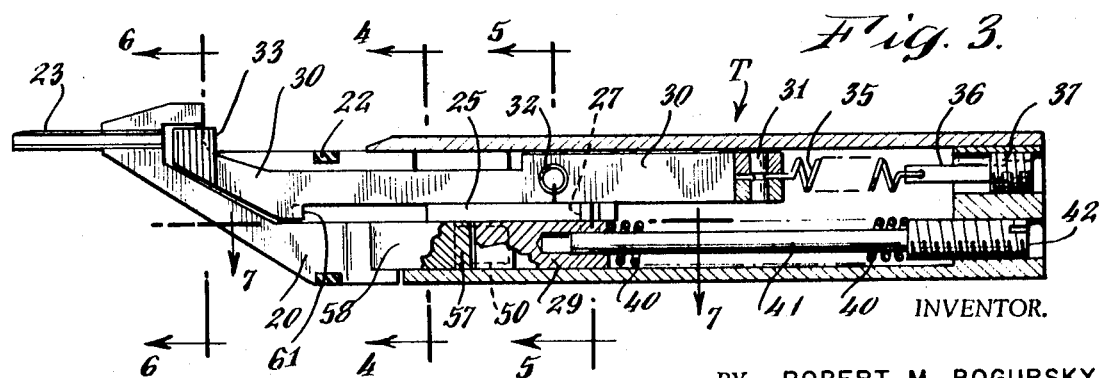

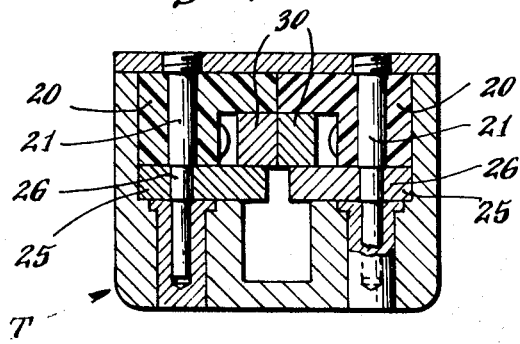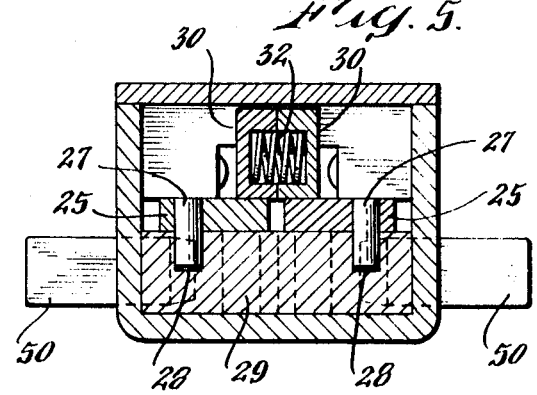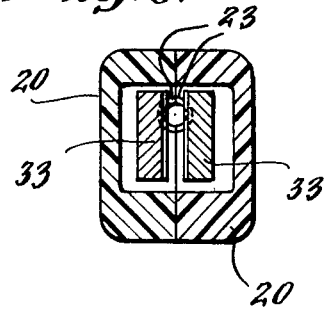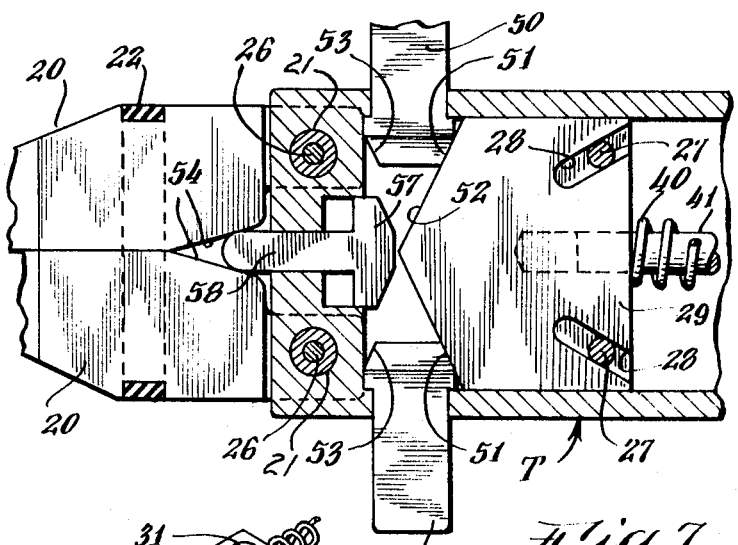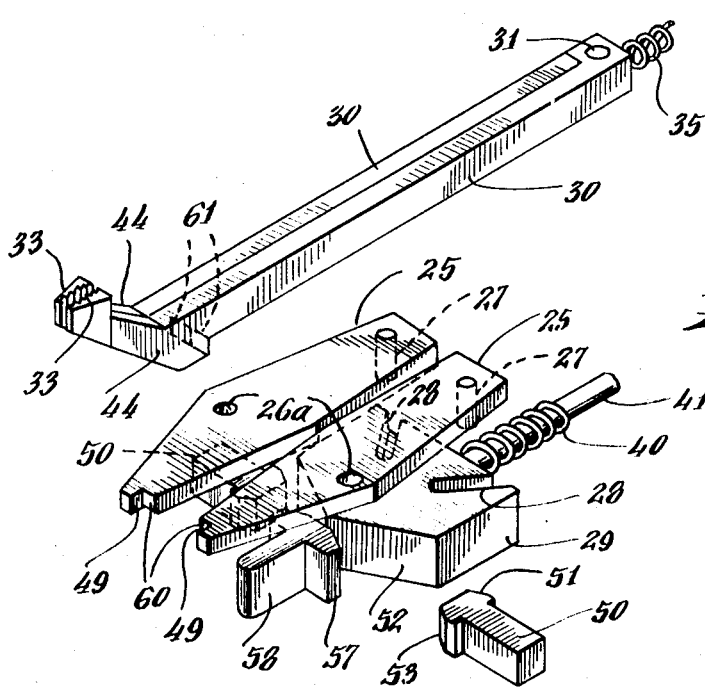

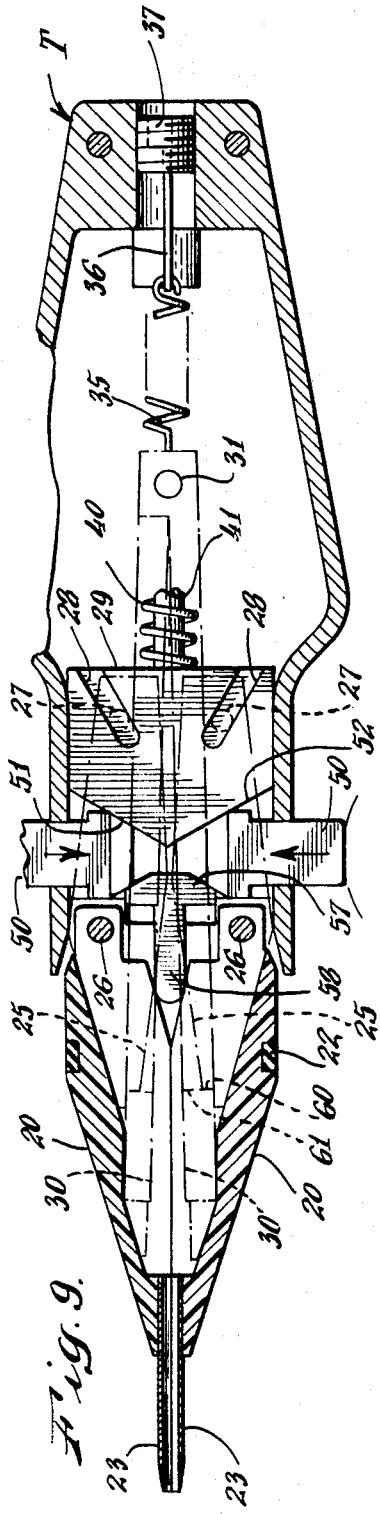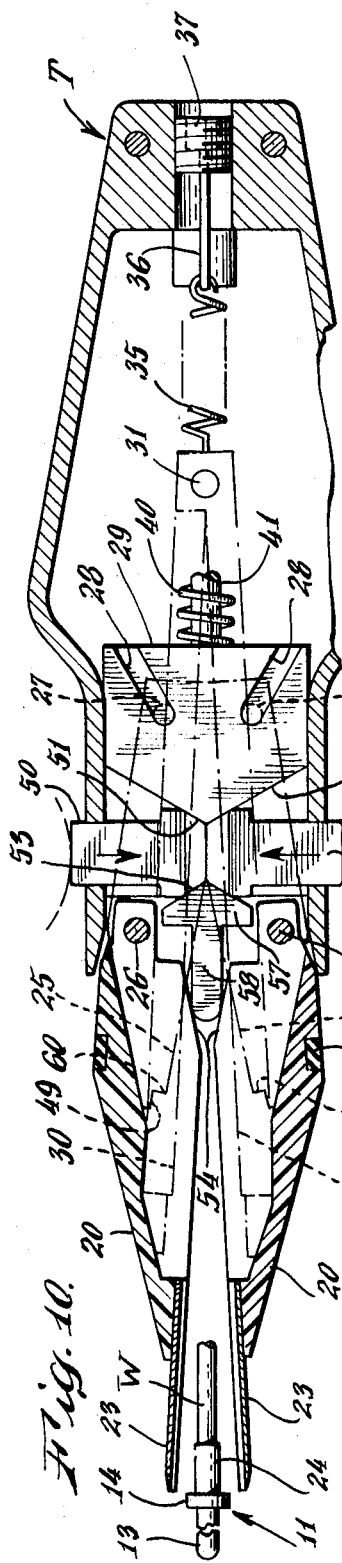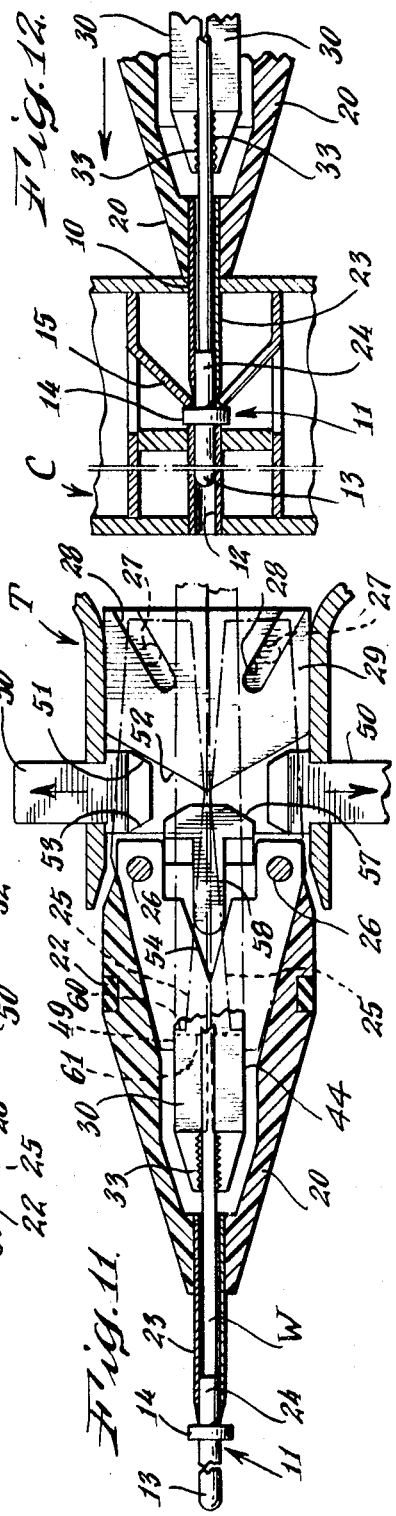

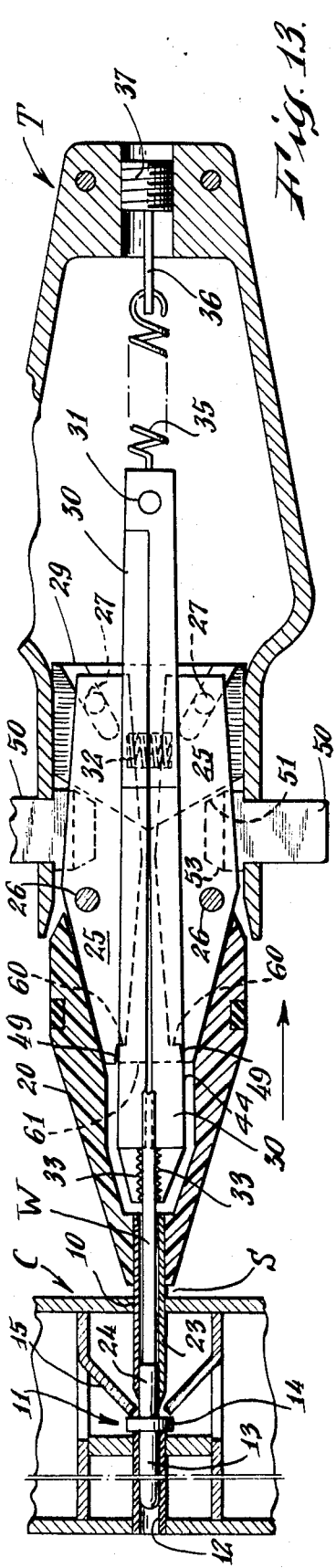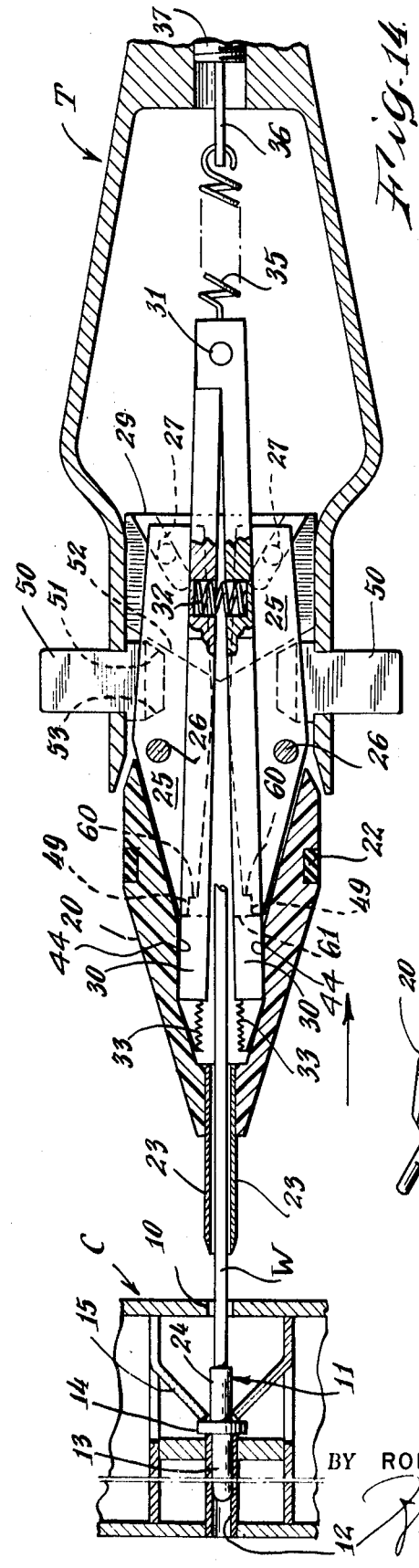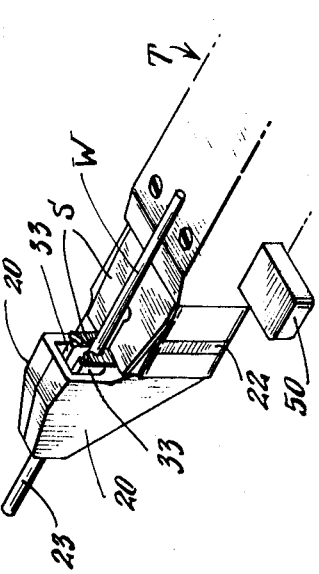

3,605,234
CONTACT INSERTION AND TESTING TOOL
Robert M. Bogursky, Milford, Conn., assignor to
Burndy Corporation
Filed Nov. 24, 1969, Ser. No. 879,326
Int. Cl. H01r 43/00; B25b 27/02
U.S. Cl. 29—203H                                17 Claims

ABSTRACT OF THE DISCLOSURE

A tool for inserting a contact into a connector, and to test whether or not the insertion is complete. The tool has a pair of jaws for pushing the contact into the connector. It has also a pair of grippers for gripping the conductor. After the contact is inserted into the connector, the tool is pulled in a direction to pull the conductor and the contact away from the connector. The tool can move a short distance relatively to the grippers, while stressing a spring. This exerts a yielding pull on the conductor for a short distance, after which the grippers, if they have not already pulled the contact out of the connector, are released from the conductor automatically.

BACKGROUND OF INVENTION

This invention relates to a tool for inserting a wired contact into a connector body, and for testing whether or not the contact has been effectively inserted into the connector body.

PRIOR ART

Tools for inserting a wired contact into a connector body are very old in the art. However, so far as I know, no tool has been contributed that will both insert the contact and act to test whether or not the contact has been effecively inserted. Thus, as will be appreciated, contacts are inserted into connector bodies at rather considerable speed by operators of varying skill. Naturally, many of the contacts will not be effectively inserted. The tool of my invention contributes a construction whereby the testing of the insertion of the contact is auomatic.

OUTLINE OF INVENTION

As a feature of my invention, I contribute a tool of the class outlined, that is adapted to grip a contact element, and to push that contact element into a connector body. The simple withdrawal of a part of the tool from the opening in which the contact element has been inserted, is effective to contribute the testing feature of the invention. Thus, when my tool is positioned relatively to the contact element so that it is effective to push the contact element into the connector body, the tool automatically grips the wire or other conductor that is secured to the contact element. This gripping is maintained as the tool is moved in a reverse direction, preferably to remove parts thereof from the connector body, and there is then relative motion between the tool body and the parts that grip the wire or other conductor. This relative motion is adapted to bring about release of the wire or conductor, but only after some pulling stress has been applied thereto, the pulling stress being sufficient to test whether or not the contact element has been effectively and properly inserted into the connector body.

It may therefore be considered that my invention contributes a tool which is adapted to apply push force to a contact element, to push it into a connector body, reverse movement of the tool being adapted to apply a pulling or reverse force to the contact element to remove it from the connector body. This reverse force is preferably exerted through the medium of a force absorbing mechanism, such as a spring, which yields to permit a limited movement of the tool relatively to the means engaging the conductor. If, during this limited movement of the tool, the yielding force has not moved the contact element out of the connector body, the contact element is then released, and the tool is made available for the insertion of a second contact element into the connector body.

DESCRIPTION OF DRAWINGS

Referring now to the drawings, FIG. 1 is a view in isometric perspective showing the utilization of my tool for inserting a wired contact into a connector body. FIG. 2 is a partial section and plan view of FIG. 1. FIG. 3 is a section taken along line 3—3 of FIG. 2. FIGS. 4, 5, 6, and 7 are respectively sections taken along line 4—4, 5—5, 6—6, 7—7 of FIG. 2. FIG. 8 is an exploded view in isometric illustrating several of the parts of my invention in order to better indicate their coaction.

FIG. 9 is a partial section and plan view of the tool illustrating one of the positions of the several parts. FIG. 10 is a view similar to FIG. 9, but illustrating the movement of certain parts of the tool from the position of FIG. 9. FIG. 11 is a further view similar to FIGS. 9 and 10 but showing the contact held by the tool for insertion into a connector body. FIG. 12 is a view similar to FIG. 11 but illustrating the tool moving a wired contact into a connector body.

FIG. 13 is a view similar to FIGS. 11 and 12, but illustrating the tool moving away from the connector body, after having inserted the wired contact into the connector body. FIG. 14 is a view similar to FIG. 13, but illustrating the relationship of the parts after the testing operation has been completed, and the conductor secured to the wired contact has been released. FIG. 15 is a view in isometric showing means for holding the wire secured to the contact element in correct relationship to the tool.

DESCRIPTION OF THE INVENTION

Referring now to the drawings, the connector body into which the contact elements are to be inserted by the use of my tool, is designated by reference letter C and is well shown in FIG. 1. It is formed usually of plastic material wtih a series of openings 10 into each of which a wired contact element is to be inserted. The openings 10 are also well illustrated in FIGS. 12, 13 and 14, where a contact element, designated generally by reference numeral 11, is shown effectively inserted into one opening. Referring to FIGS. 12, 13 and 14, it will be seen that the connector body C has a conducting socket 12 therewithin adapted for each contact element 11. It will also be noted in these figures that a part 13 of the contact element 11 is within the socket 12, while a shoulder 14 of the contact element rests against the forward wall of the socket, and naturally limits the insertion of the contact into the socket.

It will also be noted that the shoulder 14 lies just beyond the end of a spring-like detent finger 15 formed by a part of the connector body. As those skilled in the art will appreciate, the insertion of the contact 11 into the connector body will first act to cam the detent finger 15 out of the holding position shown in FIG. 12, after which detent 15 will spring back into holding position, and will prevent the outward movement of the contact by coaction with the shoulder 14 all as is well illustrated. Naturally, there may be a plurality of fingers 15.

Actually, removal of a contact element thereafter can only be secured through the use of a tool which cams the spring detent fingers 15 beyond the shoulder 14. The construction of the connector body C, and the construction of a contact 11, and its method of retention by the spring detents 15, is all standard in the art and is well understood, and is merely described briefly here in order to better outline invention and to show its relation to the prior art. It will, however, now be understood that unless a contact element 11 is inserted into the connector body into the position illustrated in FIGS. 12, 13 and 14, the shoulder 14 will not have moved beyond the spring detent fingers 15, and the contact element will not be fully inserted into position for effective operation. It is the purpose of my tool to apply outward pull to a contact element 11, after its insertion into a connector body, so that unless it has been fully locked in position within the connector body, as illustrated in the figures referred to, it will be moved outwardly. In other words, my tool tests whether or not the contact element has been locked in as required. Thus my tool accomplishes automatically, while functioning also as the means for inserting the contact element into effective position and removing it when such removal is required.

Referring now more particularly to FIGS. 1 through 9, the body of the tool of my invention is indicated generally by the reference letter T. A pair of tip holders, each designated by reference numeral 20, is pivoted to the tool body, as particularly shown in FIGS. 2 and 7 about pins 21. A resilient strap 22, which lies in a groove formed in each of these tip holders 20, urges the tip holders toward one another as shown in the several figures referred to. Fixed to each of the tip holders is an insertion tip 23, which is semi-circular in cross section, it being understood that when the two insertion tips 23 are applied one against the other, they define therebetween an opening adapted to fit on the cylindrical portion 24 of the contact element 11 as is particularly well illustrated in FIGS. 11 and 12. It will be understood that the two insertion tips 23 need not fit tightly on the part 24 of the contact element, it being the purpose of the insertion tips to apply pressure to the contact element so as to push it into its proper position relative to the connector body C. This can be accomplished by having the tips engage shoulder 14 of the contact. For this purpose the outside dimension of the insertion tips 23 is such that they may enter freely into the opening 10 of the connector body as illustrated in FIGS. 12 and 13.

Also pivoted to the body T of my tool are a pair of pressure levers each designated by reference numeral 25. Each pivot for a lever 25 is provided by a pin 26 that may be an extension of pivot shaft 21, as well illustrated in FIG. 4. Levers 25 are well illustrated in FIG. 8, where an opening 26a is shown in each lever utilized as a bearing on a pin 26. Also well shown in FIG. 8 is a pin extending downwardly from each lever 25, and designated by reference numeral 27. Each pin 27 is adapted to move in a cam slot 28 formed in what I term a cam block 29 that is slidable in the body of the tool T. The relationship of the pins 27 to the cam block 29 is well illustrated also in FIGS. 5 and 7, as well as further figures of the drawings.

My invention also utilizes a pair of grippers, each of which is designated by reference numeral 30, and probably be best illustrated in FIG. 8. The grippers 30 are pivoted to one another at pin 31, and are normally urged by a spring 32 away from one another to the position best illustrated in FIG. 14. The relationship of the spring 32 to the grippers 30, is probably best shown in FIG. 5. At the end of each gripper 30 is a serrated gripper finger 33 that is adapted to be applied against a conductor, usually a wire, secured to a contact element 11. This wire is designated by reference letter W in the several figures.

Secured to the grippers 30 through the pivot pin 31, or any other suitable means, is a tension spring 35 which tends to move the grippers 30 to the right from the position of FIG. 2 relatively to the tool T. That end of the spring 35 opposite the end secured to the pin 31, as is best seen in FIG. 3, is secured to a rod 36 that is readily adjustable through a screw 37 relatively to the tool body T. The purpose of the part 36, 37 is to adjust the tension of the spring 35, and the pressure it exerts on the grippers 30 urging them endwise of the tool, for the purpose to be explained shortly.

Naturally, movement of the grippers 30 to the right from the position of FIG. 3 must be limited, and this limiting may be arranged through a lug or other device on the tool body. However, I prefer to limit the movement of the grippers by coaction of the grippers 30 with the pressure levers 25, these pressure levers being adapted also to control the operation of the grippers, as will shortly be explained.

Referring first to FIG. 8, and also FIG. 3, it will be noted that a spring 40, surrounding a guide rod 41, applies pressure to the cam block 29, urging it to its left as can also well be seen in FIG. 7. Actually, cam block 29 is slidable relatively to guide rod 41, and guide rod 41 is adjusted relatively to the tool body by rotation of the slotted head 42 fixed to the rod 41 and in threaded relation to the tool body. Rotation of the head 42 naturally adjusts the pressure exerted by the spring 40 against the cam block 29. It is obvious from FIGS. 7 and 8, that when the cam block 29 moves under the pressure of the spring 40, it will tend through its cam slots 28 to apply pressure against the pins 27 extending from the pressure levers 25, to urge the pressure levers counterclockwise about the pivot shafts 26. When thus rotated, each of the pressure levers will exert pressure against one of the grippers 30 through contact of a notched surface 49 of each lever 25 against a surface 44 of each gripper 30.

This is obviously the relationship of the parts shown in FIGS. 2 and 11, and also as well illustrated in FIG. 9, where the grippers are in a somewhat different position than in FIG. 2, as will be set forth presently. It is important to note that the reaction forces between pressure levers 25 and grippers 30, produced by spring 40 acting through cam 29 and by spring 32 between the grippers, is such that the grippers will be urged toward one another to the position of FIG. 2 by levers 25 at all times, except when the cam block 29 is moved manually against the force of the spring 40, or when the pressure levers 25 are moved linearly away from coaction of their surfaces 49 with the surfaces 44 of the grippers 30, as will be indicated presently.

For moving the cam block 29 against the force of spring 40, I use a pair of buttons, each designated by reference numeral 50, and each slidably mounted relatively to the tool body T, as probably best illustrated in FIG. 7. Each button has a cam surface 51 adapted to operate against a cam surface 52 of the cam block 29 so as to urge the cam block 29 to the right from its position of FIG. 7 against the spring 40, when the buttons are moved inwardly of the tool body. It will also be noted that slidably mounted in the tool body, is a camming element 57, as also best illustrated in FIG. 7, this camming element having a cam portion 58 that is adapted to ride between two surfaces 54 integral with the tip holders 20. Each of the buttons has a cam surface 53 adapted to coact with a suitable cam surface of the camming element 57 for moving that camming element to the left from its position of FIG. 7. Cam portion 58 will not act upon surface 54, however, until after the cam block 29 has first been moved by the buttons 50, as is quite evident from the relationship of the parts illustrated in FIG. 7.

Referring now to FIGS. 2 and 7, the initial relationship of the parts is well illustrated. Thus, the buttons 50 are fully outward of the tool body T, being moved to that position through the force of the spring 40 acting against the cam block 29. The two pressure levers 25, through the coaction of their pins 27 with the cam slots 28 of the cam block 29, are forced against the two grippers 30. For this purpose, the two pressure levers 25 rely on the two surfaces 49 pressing against the surfaces 44 of the grippers 30. In this position of the parts, surface 60 of the pressure levers 25 best seen in FIG. 8, will coact with the surfaces 61 of the grippers 30, for limiting the movement of the grippers to the right from the position of FIG. 2 by the force exerted through tension spring 35. As was earlier indicated, other means could be utilized for this purpose, but I prefer to use the pressure levers 25 to apply both gripping pressure to the grippers 30, as well as to function as limiting means for limiting the movement of the grippers 30 under the force of the spring 35. Also, as was earlier explained, the force of the spring 32 tending to separate the grippers 30, is overcome by the force of the spring 40 operating through cam block 29 against the levers 25 which in turn press the grippers 30 toward one another to the position of FIG. 2.

It will be noted that in the position of the parts in FIG. 2, also shown in FIG. 11, the two serrated jaws 33 of the grippers 30, are maintained closely relatively to one another in a position to grip a wire W when this becomes necessary.

Referring now to FIG. 9, it will be seen that the two buttons 50 have been moved inwardly of the tool body sufficiently to move the cam block 29 so that it has through pins 27 and cam slots 28 rotated the two pressure levers 25 in opposite directions about their pivot shaft 26, bringing the ends containing pins 27 toward each other. This has naturally relieved the two grippers 30 of the pressure exerted by the pressure levers 25, so that the spring 32 has forced the grippers away from one another to the position illustrated in FIG. 9. In this position of the parts, the buttons have not as yet acted upon the camming element 57, and the two tip holders 20 remain in the same position as illustrated in FIGS. 1 and 2. Movement of the buttons 50 inwardly from the position of FIG. 9 to the position of FIG. 10, moves the cam block 29 somewhat further, so as to bring about increased movement of the two movement of the two pressure levers 25. It will be observed, moreover, in FIG. 10, that the camming surfaces 53 of buttons 50 have now also exerted pressure on the camming element 57 so that the part 58 thereof has brought about rotation of the two tip holders 20 against the pressure of the band 22. Thus, the tip holders have been rotated about pivot shafts 21, coaxial with pivots 26, to their position in FIG. 10 bringing about a separation of the two tips 23. It will be noted that in this position of the parts, the surfaces 60 of the two pressure levers 25 are in contact with the shoulders 61 of the grippers 30 holding the grippers against movement of the right under the pressure of the spring 35.

In this position of the tip holders, a contact 11 may be applied between the two tips 23. This is accomplished by placing the part 24 of contact element 11 between the tips 23, and with its wire W extending rearwardly as illustrated in FIGS. 1 and 10. With the wire W thus positioned, it is obvious that it will be adapted to be gripped by the serrated fingers 33 of the grippers 30 as best illustrated in FIG. 11, once the buttons 50 are released. In FIG. 11 the buttons 50 are shown moved outwardly to their full limit relatively to the tool body T. The cam block 29 is adapted through cam slots 28 and the pins 27, to exert maximum pressure against the pressure levers 25, forcing those levers against the grippers 30 and thereby applying maximum grip to the wire W. Naturally, the tip holders 20 have also been released from separation by the camming element 57, and are brought together to their position of FIG. 11 with the tips 23 encompassing part 24 of the contact element 11, and with the ends of the tips 23 resting against the shoulder 14 of the said contact element 11. Again, it is indicated that the surface 60 of the two pressure levers 25 are applied against the shoulders 61 of the grippers 30 to hold the grippers against movement to the right under the force of the spring 35.

With the parts held as in FIG. 11, the contact element 11 is readily insertable into an opening 10 of connector body C as well illustrated in FIG. 12. There, it will be noted, that tips 23 are within the opening 10 in the connector body, and that through pressure applied against the shoulder 14, said shoulder has been moved beyond the spring fingers 15 so that those spring fingers are in a position to prevent the movement outward of the contact element 11 as is well understood by those skilled in the art. The tool having inserted the contact element into connector C as illustrated in FIG. 12, it will now proceed to test the degree of insertion of the contact element by the mere procedure of moving the tool to the right from its position of FIG. 12 toward the position of FIG. 13 and the final position of FIG. 14. In the position of FIG. 13, it will be noted that the tips 23 have been moved away from the shoulder 14, the amount of movement being equal to space S noted in FIG. 13 between parts of the tip holders 20 and the forward surface of the connector body C. During this movement the serrated jaws 33 of the grippers 30 remain applied to the wire W because of the continued pressure exerted by the pressure levers 25. However, the pressure levers 25 being pivoted to the body of the tool through shafts 26, have therefore moved with the body T of the tool, with the surfaces 49 of the levers 25 sliding relatively to the surfaces 44 of the grippers 30. As a matter of fact, in FIG. 13, it will be noted that the extreme ends of the surfaces 49 are just about at the end of the surfaces 44, and are ready to drop downwardly behind the shoulders 61. It will be noted further, that the surfaces 60 of the pressure levers 25 have been moved away from the shoulders 61, so that the grippers 30 are free to move to the right under the force of the tension spring 35. The grippers have not so moved, however, because of the force still exerted by the pressure levers 25 holding the grippers 30 through the serrated jaws 33 against the wire W. The wire W is naturally held against movement to the right from its position of FIG. 13 because it is fixed to the contact element 11 which is held by its shoulder 14 and spring fingers 15 against movement. If, during the movement of the tool body T to the right, from the position of FIG. 12 to the position of FIG. 13, the contact element 11 were not held by the spring fingers 15, then, the tension of the spring 35 by movement of the tool body T will have forced the grippers 30 to move the right with the tool body, so as to move therewith the contact element 11 and to withdraw that contact from connector C.

If the tool body T is moved beyond its position of FIG. 13 to the position of FIG. 14, with the wire W held against movement, the ends 49 of the two pressure levers 25 will move past the surfaces 44 of the grippers 30, and will be forced behind the shoulders 61 of the grippers as well illustrated in FIG. 13. This movement of the levers 25 is made possible, because as will be remembered, the grippers 30 are held in gripping relation to the wire W, until the levers 25 are moved beyond the surfaces 44 of the grippers 30. Once the pressure levers 25 move to the position of FIG. 14, they will cease to apply pressure to the grippers 30, and the grippers will move to their separated position illustrated in FIG. 14 through action of the spring 32 normally urging the grippers away from one another. Now, the grippers will have moved out of gripping relation to the wire W. In other words, the grippers 30 are adapted to hold on to the wire W and to exert pressure pulling the wire W for a relatively short distance determined by parts 49 of the two pressure levers 25. During this relative movement between the levers 25 and the grippers 30, the spring 35 has exerted rather considerable force tending to move the contact element 11 out of the connector body C, but has not done so because the contact element 11 has been well retained within the connector C by spring fingers 15.

With the parts generally in the position of FIG. 14, inward movement of the two push buttons 50 will, through camming element 57, move the two tip holders 20 so as to separate them, and thus separate the tips 23, whereby making possible the removal of the wire W. This movement will also serve to separate fully the two pressure levers 25, so that under the influence of the spring 35, the two grippers 30 will move from their position of FIG. 14 to the position of FIGS. 2 and 9 where the surfaces 60 of the pressure levers 25, will again hold the grippers 30 against movement to the right, all as earlier explained.

In FIG. 15 I illustrate a modification of my invention in which a sighting piece R is applied to the tool for effectively assisting in the lining up of the wire W relatively to the tool, so that it will fit between the two gripper jaws 33 of the grippers 30.

I believe that the operation of my invention will now be understood by those skilled in the art. It will be appreciated that my tool, as earlier outlined, functions in an extremely simple manner to insert a contact element into a connector body, with the mere removal of the tool from the connector body, adapted to apply a yielding force to the contact element to remove it from the connector body if it has not been properly inserted therein.

I now claim:

1. In a tool of the class described, a pair of grippers movably mounted relative to one another for gripping a conductor upon the application of pressure to said grippers to move said grippers toward one another into gripping relation to said conductor, a tool body, yielding means between said grippers and said tool body whereby motion of said tool body tends through said yielding means to move said grippers with said tool body while yielding to permit movement of said tool body relatively to said grippers when said grippers are held against movement by the conductor gripped thereby and means for applying said pressure to said grippers to grip said conductor and adapted to release said grippers from said pressure upon predetermined movement of said tool body relatively to said grippers against the pressure of said yielding means.

2. In the combination of claim 1, the feature that said grippers are mounted on said tool body for bodily movement relatively thereto and that said yielding means is a spring means resisting said movement.

3. In the combination of claim 2, the feature that said means for applying pressure to said grippers are movable with said tool body relative to said grippers.

4. In the combination of claim 1, the feature that said grippers are a pair of levers pivoted relatively to one another and are connected through a spring to said tool body whereby said tool body and grippers may move bodily relatively to one another through the yielding of said spring, a pair of spring pressed pressure members movably mounted on said tool body while movable body therewith adapted to apply pressure to said grippers when said grippers and tool body are in a predetermined bodily relation in which said pressure members apply pressure to said grippers, and the movement of said tool body and its pressure members relatively to said grippers and a conductor as when said grippers grip a conductor, being adapted to stress said spring and thereafter to move said pressure members out of pressure applying relation to said grippers whereby to release the conductor.

5. In the combination of claim 3, the feature that said means for applying pressure to said grippers are a pair of spring pressed levers mounted on said tool body for movement bodily therewith whereby to move said levers relatively to said grippers when said body moves relatively to said grippers and a conductor gripped thereby.

6. In the combination of claim 5, the feature that predetermined movement of said levers relative to said grippers releases said grippers from said levers whereupon said grippers release said conductor.

7. In combination of claim 1, the feature that a pair of tips are pivoted on said tool body for movement to engage a contact secured to said conductor and for pushing the contact into a connector body socket, means on said tool body for separating said tips to facilitate the engagement of the contact by said tips, and also for separating said grippers to facilitate gripping said conductor.

8. In the combination of claim 1, the feature that a pair of tips are pivoted on said tool body for movement to engage part of a contact to which said conductor is secured for pushing the contact into a connector body socket, means on said tool body for separating said tips to facilitate the engagement of the contact by said tips, and means whereby separation of said tips is accompanied by operation of said means for applying pressure to said grippers whereby to release said grippers from said pressure.

9. In the combination of claim 8, the feature that there is a spring for separating said grippers when said grippers are released from said pressure.

10. In the combination of claim 4, the feature that a pair of tips is pivoted on said tool body for movement to engage part of a contact secured to said conductor for pushing the contact into connector body socket, means on said tool body for separating said tips to facilitate the engagement of the contact by said tips, means whereby separation of said tips is accompanied by movement of said pressure members to relieve said grippers of the pressure of said levers, and a spring for separating said grippers when released from said levers.

11. In the combination of claim 7, the feature that the parts of said tips actually engaging the contact form a small cylindrical opening therebetween into which part of the body of the contact slides, with the end of the sleeve fitted against a limit surface of said contact.

12. In the combination of claim 11, the feature that the outer surfaces of the parts of said tips actually engaging the contact fit within part of the socket opening in the connector body into which said contact is inserted.

13. In the combination of claim 10, the feature that the means on said body for separating said tips comprise a push button coacting with cam means for said tips, and additional cam means actuated by said button for first moving said pressure members to relieve said grippers of the pressure thereof.

14. In the combination of claim 1, the feature that said grippers comprise pivoted gripper levers mounted for movement bodily relatively to said tool body, said means for applying pressure to said grippers comprising a pair of pressure levers and a spring pressed cam means for pressing said levers against surfaces of said grippers to force said grippers against the conductor into gripping relation, and the movement of said pressure levers with said tool bodily relatively to said grippers moving said pressure levers away from said surfaces of said grippers to relieve said grippers of gripping pressure.

15. In the combination of claim 14, the feature that a push button is mounted on said body, and means whereby said push button contacts with said cam means for moving said levers on their pivots to relieve said grippers from gripping pressure.

16. In the combination of claim 15, the feature that a pair of tips are pivoted on said tool body for movement relatively thereto to engage a contact at the end of said conductor for pushing the contact into a connector body socket, and means whereby said push button separates said tips as it relieves said grippers of said gripping pressure.

17. In the combination of claim 7, the feature that said tool body has a sighting part for effectively positioning said conductor, whereby when said tips coact with said contact and said conductor is effectively positioned by said sighting part, said conductor is also properly positioned relatively to said grippers.

References Cited

UNITED STATES PATENTS 3,136,040    6/1964    Bauer et al. _____ 29—203H

THOMAS H. EAGER, Primary Examiner